March 14, 1939.  H. F. MOSSBERG  2,150,629
TELESCOPE
Filed April 1, 1938  2 Sheets-Sheet 1
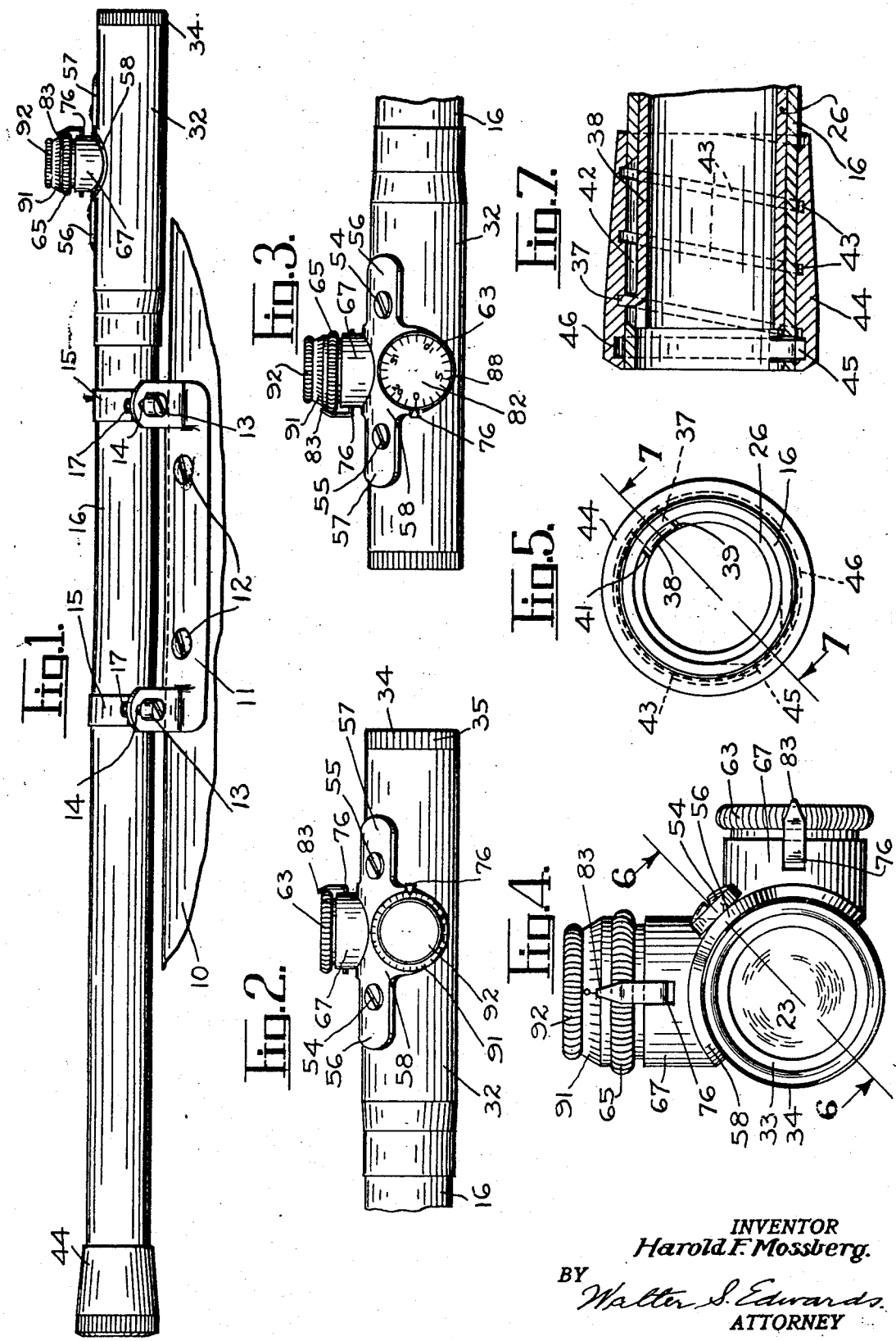
INVENTOR
Harold F. Mossberg.
BY Walter S. Edwards
ATTORNEY March 14, 1939.  H. F. MOSSBERG  2,150,629
TELESCOPE
Filed April 1, 1938   2 Sheets-Sheet 2
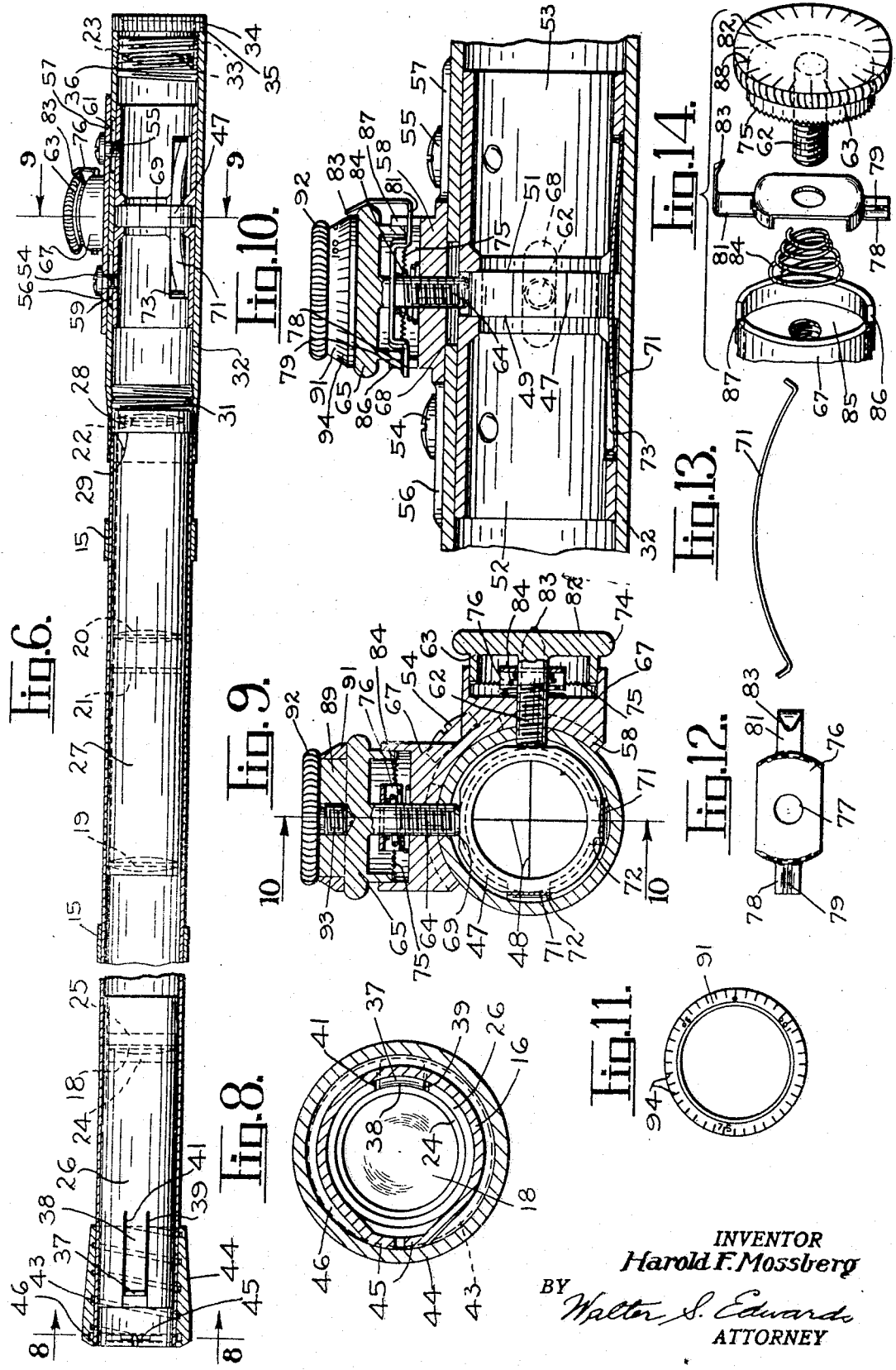
INVENTOR
*Harold F. Mossberg*
BY *Walter S. Edwards*
ATTORNEY Patented Mar. 14, 1939

2,150,629

UNITED STATES PATENT OFFICE 2,150,629

TELESCOPE

Harold F. Mossberg, New Haven, Conn., assignor to O. F. Mossberg & Sons, Inc., New Haven, Conn., a corporation of Connecticut Application April 1, 1938, Serial No. 199,326

9 Claims. (Cl. 33—50)

This invention relates to telescopes and more particularly to improvements in telescopes having means associated therewith whereby they are adapted for use with firearms for sighting purposes.

Telescopes, and especially those used with firearms for sighting purposes, require various adjustments to suit them for efficient use under varying conditions. For instance, an axial adjustment of certain of the lenses of the telescope relatively to each other and to the others is usually required to focus the telescope to suit the physical or focal characteristics of the eye of the individual using the same. In addition to such an adjustment, telescopes, when used with firearms for sighting purposes and which therefore have a reticule or other sighting means associated therewith, require adjustments to compensate for deviations caused by increases or decreases in wind pressure and also due to differences in the length of the range, or the distance the target, or object, being sighted is from the muzzle of the firearm, to insure the proper elevation and accurate subsequent operation of the firearm when the outline or point of the reticule is superimposed upon the target while sighting. It is also advantageous, and in many instances necessary, to adjust the reticule axially in respect to the lenses, or a certain lens, to bring it into sharp relief to suit the focal characteristics of the eye of the user. The above noted and required adjustments have been provided for, either singly or otherwise, by the provision of various and often comparatively expensive means and which in many instances were inefficient in use and inconvenient to make without the need of special tools.

One object of this invention is to provide an improved form of telescope and especially one which is particularly adapted for use with firearms for sighting purposes.

Another object is to provide in a telescope improved means to adjust certain of the lenses relatively to each other to suit the focal characteristics of the eye of the individual using the same.

Still another object is to provide in a telescope having a sighting reticule, improved means to adjust the reticule or its holder relatively to a certain lens or lenses to suit the focal characteristics of the eye of the user.

Further objects include: the provision in a telescope, having a sighting reticule embodied in its structure, of means to internally adjust the reticule, or its holder, to suit the requirements caused by deviations in wind pressure; to internally adjust the reticule, or its holder, to suit the elevation requirements of the firearm for the range; of means adapted to audibly indicate the amount of either of such adjustments; of means to visually indicate such adjustments; and of means adapted to be set at an indicating point whereby an adjustment in elevation may be rapidly made to suit a determined, or estimated, length of range.

A still further object is to provide in a telescope of the above type an improved audible indicating adjusting device which is adapted to be set at a selected indicating point for rapid adjustment and then may be finely adjusted by means of either audible or visual indications.

It is also an object of this invention to provide an improved form of telescope, and especially one adapted for use with firearms for sighting purposes, of generally improved construction, whereby the same will be simple, durable and comparatively inexpensive in construction, as well as convenient, practical, serviceable and very efficient in its use.

With the foregoing and other objects in view, which will appear as the description proceeds, the invention resides in the combination and arrangements of parts, and in the details of construction to be hereinafter described and claimed.

One embodiment of this invention is illustrated in the accompanying drawings, wherein:

Figure 1 is a left hand side view of a telescope embodying the principles and features of this invention;

Figure 2 is an enlarged top view of the eyepiece or rear end of the same;

Figure 3 is an enlarged right hand side view of the eye or rear end of the same;

Figure 4 is a still further enlarged end view of the eye-piece end of the telescope;

Figure 5 is an enlarged front view of the telescope;

Figure 6 is a longitudinal section of the telescope shown in Figure 1 and taken on line 6—6 of Figure 4;

Figure 7 is a longitudinal sectional view of the front end of the telescope taken on line 7—7 of Figure 5;

Figure 8 is a cross-sectional view of the front end and taken on line 8—8 of Figure 6;

Figure 9 is a cross-sectional view of the rear end and taken on line 9—9 of Figure 6;

Figure 10 is a longitudinal sectional view taken on line 10—10 of Figure 9;

Figure 11 is an enlarged top plan view of a ring which constitutes a part of the indicating device of this invention;

Figure 12 is an enlarged top plan view of a part of the audible indicating device of this invention;

Figure 13 is an enlarged side view of a leaf spring used in the telescope of this invention; and Figure 14 is an exploded view of the audible indicating device used in the telescope of this invention, the parts thereof being shown in perspective.

Referring now to the drawings wherein like reference characters designate like parts throughout the several views, the numeral 10 indicates the barrel of a firearm upon which the telescope of this invention is adapted to be mounted by means of a bracket 11, secured to the barrel 10 by means of screws 12. Bolts 13 passing through vertically elongated holes 14 provided in the bracket 11 secure bands 15 to the bracket 11. The bands 15 are secured and clamped about a tube 16, which tube forms the outer casing of the telescope of this invention, by means of screws 17. By the above means, the tube 16 is secured to a barrel 10 of a firearm in a rigid manner.

The telescope of this invention, and which is shown partly in section in Figure 6, includes the usual objective lens 18, erecting lenses 19 and 20, a perforated disc 21, a field lens 22 and an ocular lens 23. In this instance the objective lens 18 is mounted between rings 24 and 25 in the rear end of a holding tube 26 which tube is slidably mounted in the front end of the casing tube 16. The erecting lenses 19 and 20, the perforated disc 21, and the field lens 22 are permanently mounted in a holding tube 27 adapted to be slid into the tube 16 and have the edge of an end cap 28 thereof abut against the rear end 29 of the casing 16. The tube 27 is maintained rigidly in place in the casing 16 by having the cap 28 clamped against the externally threaded rear end 29 of this casing by means of a ring 31, threadingly and axially adjustable within a detachable tubular casing extension 32. The casing extension 32 is adapted to be threadingly connected to the rear end 27 of the casing 16 by means of internal threads. The ring 31 constitutes means to adjust the erecting and field lenses 19, 20 and 21 respectively relatively to the ocular lens 23 when the telescope is being assembled. The ocular lens 23 is held by rings 33 in an eye-piece 34 having a knurled annular head 35 and which is threadingly received in the internally threaded rear end 36 of the casing extension 32. The eye-piece 34 is rigidly secured to the extension 32 by tightly abutting the head 35 against the rear end 36 of the casing extension 32.

In order to adjust the telescope to suit the focal characteristics of the eye of the user when sighting the telescope, the objective lens holding tube 26 (see Figures 6, 7 and 8) is provided with an upturned lug 37, struck up from a tongue 38 formed by cutting parallel slots 39 and 41 rearwardly from the front end of the tube 26. The lug 37 extends through a longitudinal slot 42, provided in the casing 16, and rides in a spiral groove 43 formed in the interior wall of a front end cap 44. The cap 44 is secured to the front end of the casing 16 and against axial movement relatively thereto by a tongue, or tongues, 45 struck from the material of the casing 16 and firmly pressed into an annular groove 46 formed in the interior wall of the cap 44 adjacent its forward end. The casing 16 at each end of the slot 42 acts to limit the axial sliding movement of the tube 26 in the casing 16, and the side walls of the slot 42 guide the tube 26 by confining the lug 37 and prevents the tube 26 from rotating relatively to the casing 16. Due to the cooperating action between the lug 37 and the spiral groove 43, the tube 26 and with it the objective lens 18 may be quickly and suitably adjusted axially with respect to the other lenses and particularly to the ocular lens 23, to properly focus them, by rotating the cap 44 relatively to the casing 16. The spring action of the tongue 38 seats the outer end of the lug 37 against the material of cap 44 at the bottom of the groove 43 to frictionally hold the parts in their adjusted positions.

The telescope illustrated is shown provided with a sight holding member, herein illustrated as being in the form of a cross-hair reticule (see Figures 6, 9 and 10) and comprising a ring 47 having cross hairs 48 secured thereto. It will be obvious that any of the forms of sights such as posts, and which are generally used for sighting purposes with firearms, may be substituted in place of the cross hairs 48. Herein the ring 47 is shown mounted for transverse sliding movement in respect to the axis of the telescope, both in vertical and horizontal planes, between parallel ends 49 and 51 of opposing sleeves 52 and 53 respectively. The sleeves 52 and 53 are slidably mounted within the bore of the detachable casing extension 32 intermediate the rear end of the lens holding tube 27 holding the field lens 22 and the ocular lens 23. These sleeves are held by means of screws 54 and 55 in ring 47 gripping position. The screws 54 and 55 thread into the sleeves 52 and 53 respectively by depending respectively from longitudinally extending arms 56 and 57 of a bracket 58 through longitudinally elongated openings 59 and 61 respectively, which openings are formed in the wall of the extension 32. By tightening the screws 54 and 55, the sleeves 52 and 53 will be tightly clamped against the interior wall of the extension 32 and by loosening these screws the sleeves 52 and 53 and with them the ring 47 may be moved axially relative to the lenses and particularly to the ocular lens 23 to properly focus the cross hairs 48, or other form of sighting means, in respect thereto to suit the physical or focal characteristics of the eye of the user to obtain a sharp and distinct image of the sighting means 48.

Provision is included in the telescope of this invention of means whereby the reticule ring 47 and with it the sight means held thereby, herein the cross hairs 48, may be delicately adjusted transverse to the axis of the telescope in a horizontal plane to compensate for deviations in wind pressure and for differences in the length of the range. One of such adjusting means is constituted by, and includes, a threaded stud 62 extending from an inverted cylindrical cup-shaped head portion 63 and the other includes a stud 64 extending from a similar head portion 65. Each of the studs 62 and 64 is adapted to be screwed into a threaded hole 66 provided in the bore of a cylindrical cup-shaped portion 67 of the bracket 58. Each of the threaded studs 62 and 64 pass through an axially elongated opening 68 provided in the extension 32 and is adapted to engage the periphery of the ring 47, upon a flat spot 69 formed thereon, to slide the ring between the opposing ends 49 and 51 of the sleeves 52 and 53 respectively. To constantly maintain the ring 47 tightly against the respective ends of the studs 62 and 64 a bowed spring 71 is disposed diametrically opposite each of the studs 62 and 64 with its intermediate bowed portion in engagement with a similarly formed flat spot 72 on the ring. The ends of the springs 71 react against the interior wall of the extension 32. The spring 71 is disposed and retained in operable position in a slot 73 provided therefor and formed in each of the sleeves 52 and 53. The arrangement shown herein is such that the cylindrical head portions 63 and 65 telescope into the respective cylindrical portion 67 provided therefor in the bracket 58. To facilitate rotating the studs 62 and 64, the head portions 63 and 65 thereof are each provided with a finger gripping knurled rib 74.

In order to provide an audible indication of the adjusting rotation of the studs 62 and 64 by the head portions 63 and 65 respectively, the lower edge of each of the cylindrical head portions 63 and 65 are toothed by the provision of a plurality of equally spaced apart V-shaped notches 75. A bar 76, which has a central opening 77 adapted to slidingly fit over either of the studs 62 and 64 has an arm 78 extending from its central portion which arm 78 is provided with a rib 79 adapted to enter any one of the notches 75. Another arm 81 extends from the central portion of each of the bars 76 diametrically opposite from the arm 78 and is turned upwardly to lie over the top surface 82 of the head portion 63 and extend above the head portion 65 whereat the bar 76 is provided with a pointed end 83. A coiled spring 84 is provided which reacts between the base 85 of the portion 67 of the bracket 58 and the underside of the bar 76 to constantly urge the bar upwardly against the toothed edge of the respective head portions 63 and 65 whereby an audible click or snap will be produced when the respective head portion is rotated relatively to the bar 76. The bar 76 is maintained against rotation relatively to the respective head portions 63 and 65 by having its arms 78 and 81 extend through diametrically disposed slots 86 and 87 respectively, which are formed in the side walls of the cylindrical portions 67 of the bracket 58.

To visually indicate the amount of adjustment made by rotating the stud 62 by its head portion 63, the top surface 82 of the portion 63 may be provided with equally spaced apart indicating marks 88 to cooperate with the pointed end 83 of the bar 76 associated therewith. To visually indicate the amount of adjustment made by rotating the stud 64 by its head portion 65 this head portion is provided with a cylindrical and axially extending boss 89 upon which a ring 91 is rotatably mounted and adapted to be clamped against the upper end of the head portion by the head 92 of a screw 93, threadingly cooperating with the head portion 65 in a threaded hole provided therein. The ring 91 is tapered and its tapered sides are provided with indicating marks 94 spaced apart a determined amount to enable the user to quickly adjust the sight holding ring 47 in a vertical plane to cause the sight means to be elevated to suit the firearm to the estimated or known length of the range when the telescope is sighted on the target.

The spacing of the marks 94 is such that after the telescope has been assembled, it is adjusted by the stud 64 so that the firearm will be elevated to suit a selected range, for instance of twenty-five yards, the stud 64 may be quickly rotated to cause an elevation of the firearm to adapt it for a range of, for instance, fifty, seventy-five, one hundred yards, or fractions thereof, in the following manner. The telescope is first sighted on a target, the length of range of which is known, for instance twenty-five yards, by an adjustment of the stud 64. The screw 93 is loosened to release the ring 91 which is then turned to bring the zero mark thereon opposite to the pointed end 83 of the respective bar 76, and facing the user. The screw 93 is then tightened to again clamp the ring 91. Obviously whenever the stud 64 is rotated to move the point 83 away from the zero mark the elevation of the sighting means will change to suit the firearm to the range and when the point 83 is again brought back to the zero mark the sighting means will again have the proper elevation to suit the firearm for the initially selected range, provided, of course, that the stud 64 has not been rotated more than one complete revolution. Now, due to the calibrated spacing of the marks 94, the sight holding ring 47 may be adjusted by rotating the stud 64 to cause its elevation to suit the firearm for a range of say fifty yards when the mark designated by the numeral 50 on the ring 91 is opposite the pointed end 83. The required elevation of the sighting means for ranges of seventy-five, one hundred, or fractions thereof may be likewise and quickly made. It will be noted that the calibration of the marks 94 is such that the numbered ones (50, 75 and 100) are multiples of the initial length of range for which the telescope is initially set and that the intermediate marks 94 denote fractions or parts thereof between the same.

From the above description it is obvious that the improved telescope of this invention is provided with means at one end of its casing to quickly adjust the objective lens relatively to the other lenses, and at the other end with means to axially adjust the internally located sight relatively to the other lenses and particularly to the ocular lens to suit the focal characteristics of the eye of the user and particularly to accommodate emmetropic, myopic and hypermetropic eyes. Means is also provided to internally and delicately adjust the internally located sighting means, constituted herein by the cross hairs 48 and their holder 47, to suit the wind conditions and elevation requirements. In addition to the above features means is provided to set the elevation adjusting means whereby it may be quickly adjusted to suit ranges increasing or decreasing in multiples of the initially selected range to which this means is set, as well as to delicately adjust this means by either visual or audible indications to suit fractions or parts of such increases or decreases.

A telescope constructed as above described may be rigidly secured to the firearm thus obviating any variations in sighting due to vibration, as no relative movement is possible between the firearm and the telescope. The windage and elevation adjustments are more positive and less liable to vary, being made internally, and as only a relatively light weight part, the ring 47, need be moved. These adjustments are also more accurate in that the entire telescope is not moved relatively to the firearm but is always maintained parallel to the bore of the barrel, and that the sight holding ring is always moved in a plane at right angles to the axis of the telescope and never tilted. Due to the provision of means whereby the telescope may be rigidly secured to the barrel and the required adjustments are made internally, no accidental interference or change in such adjustments is possible, for instance, as by inadvertent engagement of the telescope with outside objects, by rough handling, or by vibrations caused by excessive wind.

It will be understood that the invention may be embodied in other specific forms without departing from the spirit or essential attributes thereof, and it is therefore desired that the present embodiments be considered in all respects as illustrative and not restrictive, and it will be further understood that each and every novel feature and combination present in or possessed by the means herein disclosed forms a part of the invention included in this application.

What is claimed as new and for which it is desired to secure Letters Patent, is:

1. In a telescope adapted for use as a sight for a firearm, a casing having an objective lens adjacent one of its ends and an ocular lens adjacent its other end, a sight holding ring having parallel ends disposed in said casing intermediate said lenses, parallel guides within said casing, one in abutment with each end of said ring, a bracket, connected to said guides, slidably mounted on the outside of said casing and movable axially relatively thereto to adjust said ring and guides axially of said casing, means carried by said bracket to adjust said ring transversely of said casing under control of said guides, and resilient means to urge said ring against said transversely adjusting means.

2. In a telescope sight, a tubular casing, spaced apart sleeves axially slidable in said casing, means to fixedly secure said sleeves to said casing, a ring disposed in said casing between and guided by the opposing ends of said sleeves, and means engaging said ring to adjust it transversely of said casing while it is being guided by said sleeves.

3. In a telescope sight, a tubular casing, spaced apart sleeves in said casing, a ring disposed in said casing between and engaged by the opposing ends of said sleeves, a bracket mounted on said casing for movement axially thereof, means to fixedly connect each sleeve to said bracket, and means carried by said bracket to engage said ring to adjust it transversely of said casing while guided by said sleeves.

4. In a telescope sight, a tubular casing, spaced apart sleeves in said casing, a ring disposed in said casing between and engaged and guided for movement transversely of said casing by the opposing ends of said sleeves, a bracket mounted on said casing for sliding movement axially thereof, means passing through elongated slots formed in said casing to connect each sleeve with said bracket and to releasably connect each sleeve to the casing for movement with said bracket, and means carried by said bracket and passing through an elongated slot in said casing to engage said ring to adjust it transversely of said casing.

5. In a telescope sight, a tubular casing, spaced apart sleeves in said casing, a ring disposed in said casing between and engaged and guided for movement transversely of said casing by the opposing ends of said sleeves, a first member extending through said casing into engagement with said ring and adapted to move it transversely of said casing, a spring in engagement with said ring diametrically opposite said first member, a second member extending through said casing at substantially right angles to said first member into engagement with said ring to move it transversely of said casing, and a spring in engagement with said ring diametrically opposite said second member.

6. In a telescope sight, a tubular casing, spaced apart sleeves in said casing, a ring disposed in said casing between and engaged and guided for movement transversely of said casing by the opposing ends of said sleeves, an inverted cup-shaped member having a threaded stud extending therefrom into said casing to engage said ring to adjust it transversely of said casing, a bracket on said casing through which said stud is threaded, a cross bar rotatively mounted on said stud, means on said bracket to hold said bar against rotation on said stud, a spring reacting between said bracket and said bar to press said bar against the cup-shaped member, and co-operating means between said cup-shaped member and said bar to produce audible snaps when said stud is rotated to adjust said ring transversely of said casing.

7. In a telescope as claimed in claim 6 and wherein indicating marks are provided on said inverted cup-shaped member, and a pointed extension is provided on said cross bar to co-operate with said marks to visually indicate the amount of rotation of said stud relatively to said bar.

8. In a telescope as claimed in claim 6 and wherein a ring is rotatively mounted on said inverted cup-shaped member, means to clamp said ring to said cup-shaped member, indicating marks on said ring, and a pointed extension on said cross bar to co-operate with said indicating marks to visually indicate the amount of rotation of said stud relatively to said bar.

9. In a telescope sight, a tubular casing, and a sighting means holding and adjusting device mounted for sliding movement axially in respect to said casing, said device including connected spaced apart members in said casing and having opposing end surfaces extending transversely of said casing, a ring in said casing between, and adapted to be guided by, the opposing end surfaces of said members, means extending through said casing to adjust said ring transversely of said casing while it is guided by said members, and means to fixedly secure said device to said casing in its axially adjusted position in respect to said casing.

HAROLD F. MOSSBERG.